United States Patent
Bregman Amitai

(10) Patent No.: US 10,244,225 B2
(45) Date of Patent: Mar. 26, 2019

(54) METHOD FOR DETERMINING DEPTH FOR GENERATING THREE DIMENSIONAL IMAGES

(71) Applicant: INUITIVE LTD., Ra'anana (IL)

(72) Inventor: Orna Bregman Amitai, Tel-Aviv (IL)

(73) Assignee: INUITIVE LTD., Ra'anana (IL)

(*) Notice: Subject to any disclaimer, the term of this patent is extended or adjusted under 35 U.S.C. 154(b) by 84 days.

(21) Appl. No.: 15/318,021

(22) PCT Filed: Jun. 4, 2015

(86) PCT No.: PCT/IL2015/000030
§ 371 (c)(1),
(2) Date: Dec. 12, 2016

(87) PCT Pub. No.: WO2015/189836
PCT Pub. Date: Dec. 17, 2015

(65) Prior Publication Data
US 2017/0127044 A1 May 4, 2017

Related U.S. Application Data

(60) Provisional application No. 62/011,061, filed on Jun. 12, 2014.

(51) Int. Cl.
*H04N 13/239* (2018.01)
*G06T 7/593* (2017.01)
*H04N 13/00* (2018.01)

(52) U.S. Cl.
CPC ........... *H04N 13/239* (2018.05); *G06T 7/593* (2017.01); *G06T 2207/10021* (2013.01);
(Continued)

(58) Field of Classification Search
CPC ............... G06T 2207/20; G06T 7/593; G06T 2207/10021; G06T 2207/20228; H04N 13/0239; H04N 2013/0081
(Continued)

(56) References Cited

U.S. PATENT DOCUMENTS 8,208,716 B2 6/2012 Choi et al.
2004/0258279 A1 12/2004 Hirvonen et al.
(Continued)

FOREIGN PATENT DOCUMENTS

WO 2013085525 A1 6/2013
WO 2014154839 A1 10/2014

*Primary Examiner* — Nguyen T Truong
(74) *Attorney, Agent, or Firm* — Browdy and Neimark, PLLC

(57) ABSTRACT

A method is provided for generating a three dimensional frame. The method comprises the steps of: retrieving information that relates to a plurality of images of a target captured by two image capturing devices; determining data that will be applied for analyzing objects of interests included in the captured images; calculating disparity between groups of corresponding frames, wherein each of said groups comprises frames taken essentially simultaneously by the two image capturing devices; determining an initial estimation of a disparity range for the frames included in the groups of the corresponding frames; evaluating a disparity range value for each proceeding group based on information retrieved on a dynamic basis from frames included therein, and changing the value of said disparity range when required; and applying a current value of the disparity range in a stereo matching algorithm, and generating a three-dimensional frame for each proceeding group of corresponding frames.

6 Claims, 1 Drawing Sheet

(52) U.S. Cl.
CPC ...... *G06T 2207/20* (2013.01); *G06T 2207/20228* (2013.01); *H04N 2013/0081* (2013.01)

(58) Field of Classification Search
USPC .......................................................... 348/47
See application file for complete search history.

(56) References Cited

U.S. PATENT DOCUMENTS

| | | |
|---|---|---|
| 2006/0193509 A1 | 8/2006 | Criminisi et al. |
| 2007/0110298 A1 | 5/2007 | Graepel et al. |
| 2007/0255480 A1 | 11/2007 | Southall et al. |
| 2011/0074933 A1 | 3/2011 | Held et al. |
| 2011/0080466 A1 | 4/2011 | Kask et al. |
| 2011/0158528 A1 | 6/2011 | Yea et al. |
| 2012/0008855 A1 | 1/2012 | Hirai et al. |
| 2012/0033051 A1 | 2/2012 | Atanassov et al. |
| 2012/0140038 A1 | 6/2012 | Bi et al. |
| 2012/0162379 A1 | 6/2012 | Dahi et al. |
| 2012/0176473 A1 | 7/2012 | Genova et al. |
| 2012/0249747 A1 | 10/2012 | Aviv et al. |
| 2013/0004058 A1 | 1/2013 | Pan et al. |
| 2013/0136339 A1 | 5/2013 | Moon et al. |
| 2013/0176397 A1 | 7/2013 | Oskam et al. |
| 2013/0177237 A1 | 7/2013 | Schamp |
| 2013/0266213 A1 | 10/2013 | Yamashita et al. |
| 2014/0198977 A1 | 7/2014 | Narasimha et al. |
| 2015/0206313 A1 | 7/2015 | Reif et al. |

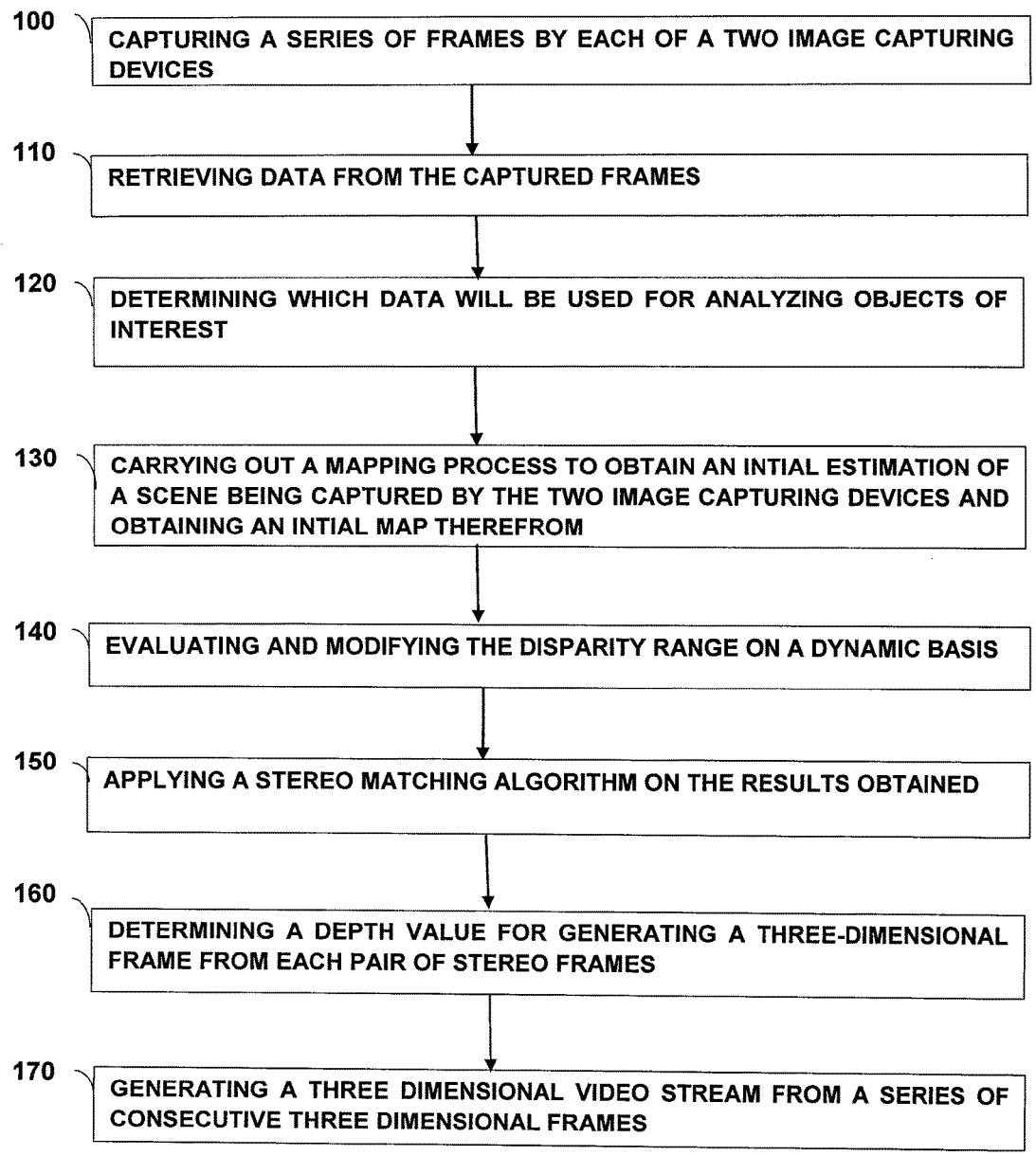

METHOD FOR DETERMINING DEPTH FOR GENERATING THREE DIMENSIONAL IMAGES

TECHNICAL FIELD

The present disclosure generally relates to methods for using optical devices, and more particularly, to methods that enable stereoscopic reconstruction of three-dimensional images.

BACKGROUND

A stereoscopic camera arrangement is an apparatus made of two camera units, assembled in a stereoscopic module. Stereoscopy (also referred to as "stereoscopics" or "3D imaging") is a technique for creating or enhancing the illusion of depth in an image by means of stereopsis. In other words, it is the impression of depth that is perceived when a scene is viewed with both eyes by someone having normal binocular vision, which is responsible for creating two slightly different images of the scene in the two eyes due to the eyes'/camera's different locations.

Combining 3D information derived from stereoscopic images, and particularly for video streams, requires search and comparison of a large number of pixels to be held for each pair of images, each of which derived from a different image capturing device. For example, in a case of a 2MP sensor operating at 60 fps (frames per second) and generating 16 bpp (bits per pixel), the bit rate would be a 4 MB per frame or over 240 MB per second. This amount of information makes it virtually impossible (particularly for consumer products such as laptops and tablets) to have it processed or even stored for a short while, as to do so would require resources that are usually unavailable in consumer products, given their expected target prices.

Depth calculation under real time conditions typically consumes quite a substantial amount of the processing device's available CPU.

For carrying out depth calculation using rectified stereo images, the depth is calculated by the disparity between the two images.

The depth to be detected, dictates a disparity range to be checked. In order to detect all objects that are present within a required depth range, the system must check each pixel in order to find the best disparity of all values for this range. This process is very cumbersome and may require a considerable CPU resources or dedicated hardware, or might take a long period of time.

Therefore, there is a need for a method that would allow detecting only part of the optional disparity values but at the same time would not lead to missing objects that are present in these images.

Also, it is known that using only a partial range of the disparity existing between the two images, might cause a problem due to the fact that features present outside of the defined range, might be considered as features that are present within the range, and clearing the false disparity values has no efficient full solution. Therefore, the solution for this problem is to calculate the disparity in a loop process, wherein each stage uses only a certain range of disparities, and then to merge information that has conflicts due to false disparities that exist within each range.

In view of the above, the common solution nowadays is to check all relevant disparity values. This method, as explained above, may provide good results but yet consumes considerable amount of system resources.

SUMMARY OF THE DISCLOSURE

The disclosure may be summarized by referring to the appended claims.

It is an object of the present disclosure to provide a method for using statistics of various parameters in very low resolution to enable better and fast analyzing of large amount of image data (received from one or more sensors).

It is another object of the present disclosure to provide a method for analyzing video frames by gathering information on the captured scene in the video frames and dynamically changing the disparity range used for a specific part thereof.

It is still another object of the present disclosure to provide a method for analyzing a sequence of images acquired, where the first few images are used to map and gather information on the captured scene, whereas for the following image(s), a dynamic decision-taking process is applied, for updating the image(s) and allowing to focus mainly on dynamic parts of the images.

Other objects of the present invention will become apparent from the following description.

According to one embodiment of the disclosure there is provided a method for generating a three dimensional frame, a method that comprises the steps of:

retrieving information that relates to a plurality of images of a single target that were captured by at least two image capturing devices;

based on the retrieved information, determining which data will be used for analyzing objects of interests that are included in said captured images;

calculating disparity between groups of corresponding frames, wherein each of said groups of corresponding frames comprises frames that were taken essentially simultaneously by said at least two image capturing devices;

determining an initial estimation of a disparity range for the frames included in one or more of the groups of the corresponding frames;

evaluating a disparity range value for each proceeding group of corresponding frames based on information retrieved on a dynamic basis from the frames included in said proceeding group, and changing the value of said disparity range when required; and applying current value of the disparity range in a stereo matching algorithm, and generating a three-dimensional frame for each proceeding group of corresponding frames, based on the results obtained from the stereo matching algorithm.

According to another embodiment, the step of obtaining an initial estimation of a scene being captured by the at least two image capturing devices, is carried out by applying low resolution to analyze information retrieved from the captured images.

In accordance with another embodiment, the step of obtaining an initial estimation of a scene being captured by the at least two image capturing devices, is carried out by pruning input data retrieved from the captured images.

By yet another embodiment, the pruning of the input data retrieved, is carried out by applying only a sample of disparity values that are within the determined disparity range.

According to still another embodiment, the method further comprising a step of generating a three dimensional video clip based on a series of three-dimensional frames obtained from consecutive groups of corresponding frames.

In accordance with yet another embodiment, the step of applying current value of the disparity range in a stereo matching algorithm, comprises applying the value of the disparity range that is being dynamically updated to focus mainly on parts of the image that are dynamically changed in consecutive captured frames, i.e. that are dynamically changed from one captured frame to one or more of its proceeding captured frames.

The term "stereoscopic" (or "stereo") as used herein throughout the specification and claims, is used typically to denote a combination derived from two or more images, each taken by a different image capturing means, which are combined to yield a perception of three-dimensional depth. However, it should be understood that the scope of the present invention is not restricted to deriving a stereoscopic image from two sources, but also encompasses generating an image derived from three or more image capturing means.

The term "image" as used herein throughout the specification and claims, is used to denote a visual perception being depicted or recorded by an artifact (a device), including but not limited to, a two dimensional picture, a video stream, a frame belonging to a video stream, and the like.

BRIEF DESCRIPTION OF THE DRAWING

For a more complete understanding of the present invention, reference is now made to the following detailed description taken in conjunction with the accompanying drawing wherein:

FIG. 1—is a flow chart illustrating a method for carrying out an embodiment of the present invention.

DETAILED DESCRIPTION

In this disclosure, the term "comprising" is intended to have an open-ended meaning so that when a first element is stated as comprising a second element, the first element may also include one or more other elements that are not necessarily identified or described herein, or recited in the claims.

In the following description, for the purposes of explanation, numerous specific details are set forth in order to provide a better understanding of the present invention by way of examples. It should be apparent, however, that the present invention may be practiced without these specific details.

As already explained above, the method provided herein may be regarded as a method that comprises two main stages. At the initial stage, a relatively small number of images are obtained from the two or more image capturing devices. Based on data retrieved from these images, a determination is made as to data that will be used for analyzing objects of interests, or in other words, a range of interest for disparity calculation is determined. It should be noted however that this determination may be a dynamic determination and may be changed during the second stage based on data that would be retrieved and analyzed during the second stage.

Let us turn now to the first stage, where a mapping process is carried out to allow an initial studying of the scene being captured by the two or more image capturing devices. There are a number of options to carry out this first stage, among which is the option of applying low resolution to analyze the images or pruning the input data, in order to obtain the initial map.

When following the first option (i.e. to determine the relevant depth map with small number of disparity input images at reduced resolution), where the resolution may be reduced by a factor F, a reduction which in turn increases the effective disparity range by a factor of F. It should be noted however that the effect of this operation on the depth is not linear. Obviously, the output accuracy is lower than the one that would have been achieved had the full resolution been used. This option may lead to a result where thin objects might be missed.

When following the second option, i.e. pruning the input data, instead of analyzing all disparities within the disparity range, only a sample of disparity values (included within the defined range) are applied. By following this option, objects that are in the sampled disparity values will be clearly detected, whereas objects that are in disparities close to the sampled value would be detected only if the detection thresholds are high enough. On the other hand, if the threshold value is increased, noise will also be increased since low thresholds are used for clearing out the noise. Yet the results may still be improved by applying a low threshold (to reduce noise level) combined with repeating the process using different sampling method every time. Nevertheless, as in the previous option, thin objects might be missed also when applying this option, since they might not be in the data included in the samples used.

Irrespective of which of the options is chosen to obtain the initial map and to determine therefrom the "disparity range of interest" (i.e. the range where the objects of interest are), at the second stage, the disparity range may be changed on a dynamic basis. In other words, the information retrieved is analyzed and applied in a mechanism which may be considered as tuning the low resolution information. Thus, the disparity value achieved in this stage may be such that it becomes closer to values calculated for the low resolution disparity in the neighborhood of the pixels being processed.

For example, if the disparity values in frame j start with 1 and increased each step by the value of 4, the next frames may start with the disparities values of 2, 3 or 4.

FIG. 1 illustrates a flow chart which exemplifies one embodiment of the method provided for carrying out the present invention.

In this example, two sensors that are operative as image capturing devices (e.g. video cameras) are comprised in an electronic apparatus. The sensors are focused at a target, each capturing a consecutive series of frames (e.g. a video clip) thereof (step 100).

First, once a few frames (images) are obtained from each of the two video cameras, data is retrieved from these frames (step 110), and a determination is made as to the data that will be used for analyzing objects of interests (step 120), thereby determining a range of interest for calculating the disparity between pairs of corresponding frames, taken essentially simultaneously, each by a different one of the video cameras.

Then, a mapping process is carried out (step 130) to obtain an initial estimation (studying) of the scene being captured by the two video cameras. There are a number of options to carry out this step, such as applying low resolution to analyze the images or pruning the input data in order to obtain the initial map.

Once the initial map has been acquired and the disparity range of interest has been determined therefrom (i.e. the range where the objects of interest are included), the disparity range is evaluated (and changed if necessary) on a dynamic basis (step 140). In other words, the information retrieved is analyzed and applied in a mechanism which may be considered as one that fine-tunes the low resolution information. Thus, the disparity value achieved while repeating this step becomes closer to values calculated for the low resolution disparity in the neighborhood of the pixels being processed.

The results obtained in step 140 are applied by a stereo matching algorithm (step 150) that enables determining a depth value for generating a three-dimensional frame from each pair (or more) of the stereo frames (step 160). Then, from a series of consecutive three dimensional frames obtained in step 150, the required three dimensional video stream (step 170) is generated, and may then be provided for display.

In the description and claims of the present application, each of the verbs, "comprise" "include" and "have", and conjugates thereof, are used to indicate that the object or objects of the verb are not necessarily a complete listing of members, components, elements or parts of the subject or subjects of the verb.

The present invention has been described using detailed descriptions of embodiments thereof that are provided by way of example and are not intended to limit the scope of the invention in any way. For example, the apparatus may include a cameras' array that has two or more cameras, such as, for example, video cameras to capture two or more video streams of the target. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art. The scope of the invention is limited only by the following claims.

The invention claimed is:

1. A method for generating a three dimensional frame, said method comprising the steps of:
    retrieving information that relates to a plurality of images of a single target, captured by at least two image capturing devices, wherein said plurality of images includes groups of corresponding frames;
    based on the retrieved information, determining which data will be applied for analyzing objects of interests that are included in said plurality of captured images;
    calculating disparity between said groups of corresponding frames, wherein each of said groups of corresponding frames comprises frames that were taken essentially simultaneously by said at least two image capturing devices;
    determining an initial estimation of a disparity range for the frames included in one or more of the groups of the corresponding frames by reducing an image resolution of the frames;
    evaluating a disparity range value for each proceeding group of corresponding frames on a dynamic basis using reduced image resolution frames included in said proceeding group, and changing the value of said disparity range when required;
    using a current value of said disparity range in a stereo matching algorithm applied on each group of corresponding frames with image resolution greater than the image resolution used in evaluating the disparity range value; and
    generating a three-dimensional frame for each proceeding group of corresponding frames, based on the results obtained from the stereo matching algorithm.

2. The method of claim 1, wherein said step of obtaining an initial estimation of a scene being captured by the at least two image capturing devices includes pruning input data retrieved from the captured images.

3. The method of claim 2, wherein the pruning of the input data retrieved is carried out by applying only a sample of disparity values that are included within the determined disparity range.

4. The method of claim 1, further comprising a step of generating a three dimensional video clip based on a series of three-dimensional frames obtained from consecutive groups of corresponding frames.

5. The method of claim 1, wherein said step of applying current value of the disparity range in a stereo matching algorithm, comprises applying the value of the disparity range that is being dynamically updated to focus mainly on parts of the image that are dynamically changed from one captured frame to one or more of its proceeding captured frames.

6. An electronic apparatus, comprising:
    at least two image sensors configured to capture a consecutive series of frames;
    a processing device configured to:
        retrieve information that relates to a plurality of images of a single target, captured by said at least image sensors, wherein said plurality of images includes groups of corresponding frames;
        based on the retrieved information, determine which data will be applied for analyzing objects of interests that are included in said plurality of captured images;
        calculate disparity between said groups of corresponding frames, wherein each of said groups of corresponding frames comprises frames that were taken essentially simultaneously by said at least two image capturing devices;
        determine an initial estimation of a disparity range for the frames included in one or more of the groups of the corresponding frames by reducing an image resolution the frames;
        evaluate a disparity range value for each proceeding group of corresponding frames based on the reduced image resolution on a dynamic basis from the frames included in said proceeding group, and changing the value of said disparity range when required;
        use a current value of said disparity range in a stereo matching algorithm applied on each group of corresponding frames with image resolution greater than the image resolution used in evaluating the disparity range value; and
        generate a three-dimensional frame for each proceeding group of corresponding frames, based on the results obtained from the stereo matching algorithm.

* * * * *